(12) United States Patent
Frazier et al.

(10) Patent No.: US 9,781,216 B2
(45) Date of Patent: *Oct. 3, 2017

(54) LOCATION BASED CONTENT AGGREGATION AND DISTRIBUTION SYSTEMS AND METHODS

(71) Applicant: Facebook, Inc., Menlo Park, CA (US)

(72) Inventors: Kristopher T. Frazier, Frisco, TX (US); Brian F. Roberts, Dallas, TX (US); Donald H. Relyea, Dallas, TX (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,217

(22) Filed: Apr. 27, 2016

(65) Prior Publication Data

US 2016/0241652 A1 Aug. 18, 2016

Related U.S. Application Data

(63) Continuation of application No. 14/081,689, filed on Nov. 15, 2013, now Pat. No. 9,338,123, which is a continuation of application No. 13/354,729, filed on Jan. 20, 2012, now Pat. No. 8,612,542, which is a continuation of application No. 13/006,067, filed on Jan. 13, 2011, now Pat. No. 8,103,741, which is a continuation of application No. 12/059,742, filed on Mar. 31, 2008, now Pat. No. 7,882,201.

(51) Int. Cl.
| | | |
|---|---|---|
| G06F 15/16 | (2006.01) | |
| H04L 29/08 | (2006.01) | |
| H04L 12/58 | (2006.01) | |
| H04W 4/02 | (2009.01) | |
| G01C 21/26 | (2006.01) | |
| G06F 9/445 | (2006.01) | |
| G06F 17/30 | (2006.01) | |
| G06F 9/54 | (2006.01) | |

(52) U.S. Cl.
CPC .............. *H04L 67/18* (2013.01); *G01C 21/26* (2013.01); *G06F 9/445* (2013.01); *G06F 9/542* (2013.01); *G06F 17/30241* (2013.01); *H04L 51/16* (2013.01); *H04L 51/32* (2013.01); *H04W 4/023* (2013.01)

(58) Field of Classification Search
CPC .... G06F 9/445; G06F 9/542; G06F 17/30241; G01C 21/26
USPC ...... 340/995.1; 701/482, 484, 516; 709/217, 709/206
See application file for complete search history.

(56) References Cited

U.S. PATENT DOCUMENTS

| | | | | |
|---|---|---|---|---|
| 6,446,004 B1 * | 9/2002 | Cao | ........................ | G06F 9/445 701/482 |
| 2006/0238381 A1 * | 10/2006 | Kimchi | .................. | G01C 21/26 340/995.1 |

* cited by examiner

*Primary Examiner* — Kyung H Shin
(74) *Attorney, Agent, or Firm* — Baker Botts L.L.P.

(57) ABSTRACT

In one embodiment, a method includes receiving a content posting from a device associated with a first user, the content posting including data representative of a content instance and an associated geographic location; determining that a second user is associated with the geographic location; and enabling communications associated with the content instance between a client device associated with the first user and a client device associated with the second user.

49 Claims, 11 Drawing Sheets

LOCATION BASED CONTENT AGGREGATION AND DISTRIBUTION SYSTEMS AND METHODS

PRIORITY

This application is a continuation application of U.S. patent application Ser. No. 14/081,689, filed 15 Nov. 2013; which is a continuation of U.S. patent application Ser. No. 13/354,729, filed 20 Jan. 2012 and issued as U.S. Pat. No. 8,612,542; which is a continuation application of U.S. patent application Ser. No. 13/006,067, filed 13 Jan. 2011 and issued as U.S. Pat. No. 8,103,741; which is a continuation application of U.S. patent application Ser. No. 12/059,742, filed 31 Mar. 2008 and issued as U.S. Pat. No. 7,882,201. The contents of these applications are hereby incorporated by reference in their respective entireties.

BACKGROUND INFORMATION

Advances in electronic communications technologies have interconnected people and allowed for creation and distribution of electronic content perhaps better than ever before. For example, mobile phones exist that can be used to take photographs, record audio, capture video, and communicate via voice calls, voice messages, text messages, and electronic mail messages ("e-mail messages"). Mobile phones can also be used to present the created content for experiencing by a user, or the content may be transferred from the mobile phone to a more long-term data storage platform, which can be used to store and present the content. However, if a user of a device such as a mobile phone wants to provide created content to other people, typically, the user must actively provide the content to each person (e.g., by electronic messaging).

As an example, a user may utilize a mobile phone camera to capture a photograph at a particular geographic location. If the user wants to share the photograph, the user must actively send a copy of the photograph to each desired recipient. In addition, the user may have to provide an explanation of the content in order for the content to make sense to each recipient. For instance, the user may send a text message explaining, "Here is a picture from my trip to Bermuda." This process quickly becomes repetitive and time consuming when repeated for multiple different recipients. Moreover, the user may have no way of identifying certain people who may be interested in, or become interested in, content associated with the geographic location.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
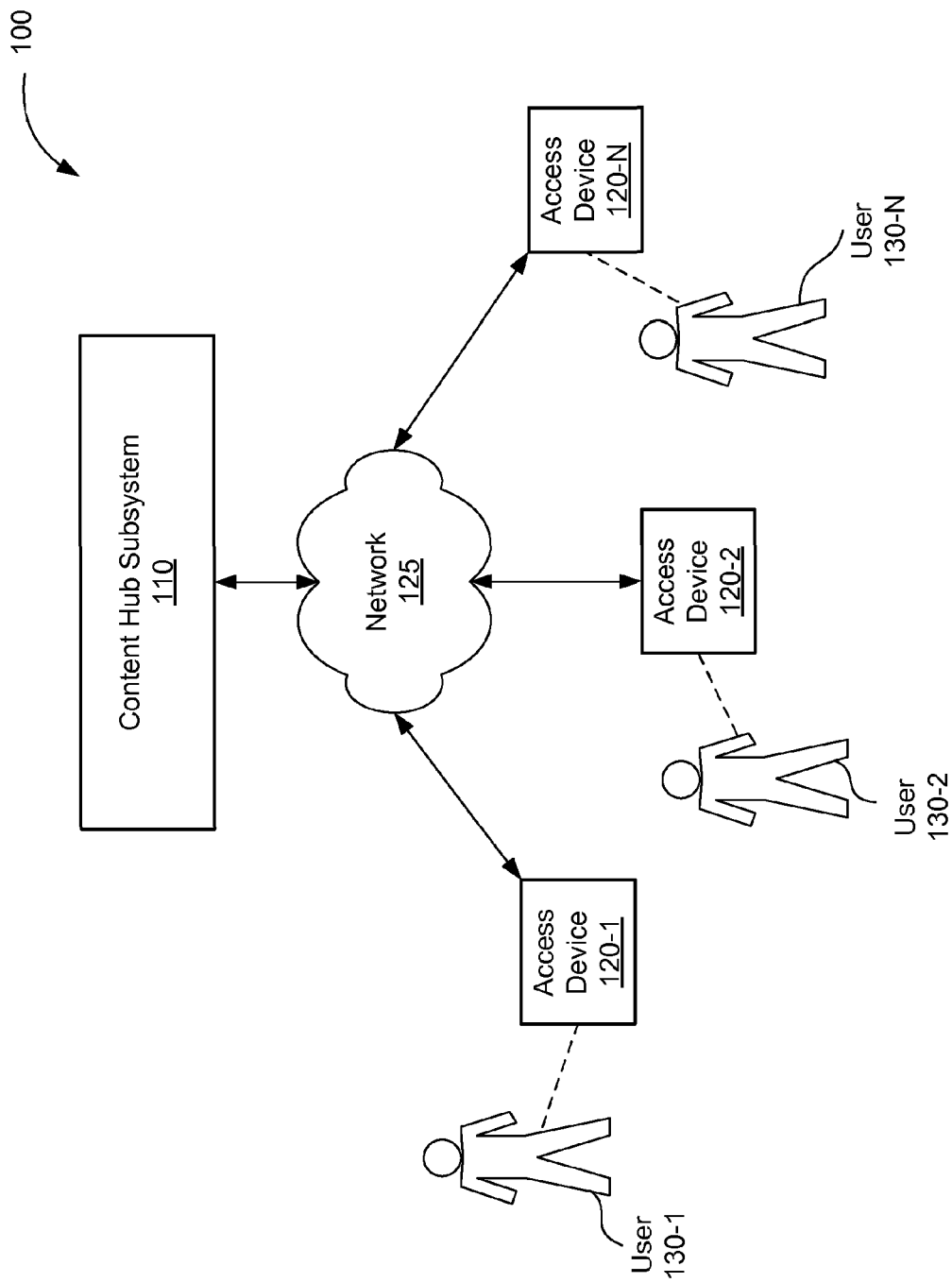
FIG. 1 illustrates an exemplary location based content aggregation and distribution system.

Exemplary location based content aggregation and distribution systems and methods are described herein. In certain exemplary embodiments, one or more users of one or more access devices configured to communicate with a content hub subsystem by way of a network are able to utilize the access devices to create content, associate the content with geographic locations to form content postings, and provide the content postings, including the content and associated geographic location data, to the content hub subsystem. As used herein, the term "content" may refer to one or more "content instances," which may include, but are not limited to, electronic data representative of text, one or more messages (e.g., short message service ("SMS") messages or multimedia message service ("MMS") messages), one or more symbols, one or more graphics, one or more images (e.g., digital photographs and video frames), video, audio, multimedia, or any segment, portion, component, or combination thereof.

The content hub subsystem may be configured to aggregate and store the content postings received from the access devices, and to selectively distribute the content based on the geographic locations indicated by the location data. For instance, when a user with an access device enters within a pre-determined physical distance, i.e., a predefined geographic proximity, of a geographic location associated with a content instance, the content hub subsystem may make the content instance accessible to the user. The content hub subsystem may send a notification of the content becoming accessible to the access device, and the user may utilize the access device to request and receive (e.g., download) the content instance from the content hub subsystem.

In this or similar manner, users of access devices may create and post content associated with geographic locations, and the content may be selectively distributed to users and/or access devices based on the geographic locations. Accordingly, users are able to share posted content with one another in connection with geographic locations.

In certain embodiments, the content hub subsystem may be configured to continue to provide access to content for a predefined length of time (e.g., a day, week, month, or indefinitely). Accordingly, users may have access to content based on past connections with geographic locations associated with the content.

The aggregation and distribution of posted content may enable users to connect with one another based on geographic locations. In certain embodiments, the content hub subsystem may be configured to provide users associated with common content and/or geographic locations with one or more tools for annotating the content and/or communicating with one another. For example, a user who has been granted access to posted content may annotate the content such as by editing the content, rating the content, or posting a comment about the content to the content hub subsystem. The user who posted the content may access the annotation and respond to the user who provided the annotation. Such communications between the users may be hosted as a communication thread to which the users involved may be granted access.

Exemplary embodiments of location based content aggregation and distribution systems and methods will now be described in more detail with reference to the accompanying drawings.

FIG. 1 illustrates an exemplary location based content aggregation and distribution system 100 (or simply "system 100"). As shown in FIG. 1, system 100 may include a content hub subsystem 110 selectively and communicatively connected to a plurality of access devices 120-1 through 120-N (collectively "access devices 120") by way of a network 125.

The access devices 120 and the content hub subsystem 110 may communicate over network 125 using any communication platforms and technologies suitable for transporting data representative of content and geographic location data, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TOMA") technologies, Short Message Service ("SMS"), Multimedia Message Service ("MMS"), radio frequency ("RF") signaling technologies, signaling system seven ("SS?") technologies, Ethernet, in-band and out-of-band signaling technologies, and other suitable communications networks and technologies.

Network 125 may include one or more networks, including, but not limited to, wireless networks, mobile telephone networks (e.g., cellular telephone networks), closed media networks, subscriber television networks, cable networks, satellite networks, the Internet, intranets, local area networks, public networks, private networks, optical fiber networks, broadband networks, narrowband networks, voice communications networks, Voice over Internet Protocol ("VoIP") networks, Public Switched Telephone networks ("PSTN"), and any other networks capable of carrying data representative of content and communications signals between access devices 120 and content hub subsystem 110. Communications between the content hub subsystem 110 and the access devices 120 may be transported using any one of above-listed networks, or any combination or sub-combination of the above-listed networks. In certain exemplary embodiments, network 125 includes a mobile telephone network.

In some examples, system 100 may include any computer hardware and/or instructions (e.g., software programs), or combinations of software and hardware, configured to perform the processes described herein. In particular, it should be understood that components of system 100 may be implemented on one physical computing device or may be implemented on more than one physical computing device. Accordingly, system 100 may include any one of a number of well known computing devices, and may employ any of a number of well known computer operating systems, including, but by no means limited to, known versions and/or varieties of Microsoft Windows, UNIX, Macintosh, and Linux operating systems.

Accordingly, the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Access devices 120 may be associated with users, which in certain embodiments may be subscribers to or users of one or more services (e.g., a wireless telephone service) provided over network 125. As an example, FIG. 1 shows users 130-1, 130-2, and 130-N (collectively "users 130") as being associated with access devices 120-1, 120-2, and 120-N, respectively. The exemplary users 130 and their particular associations with access devices 120 are shown for illustrative purposes. Other user associations with access devices 120 may be defined in system 100.

Access device 120 may include any device configured to perform one or more of the access device processes described herein, including communicating with content hub subsystem 110 by way of network 125. Access device 120 may include, but is not limited to, a wireless computing device, a wireless communication device (e.g., a mobile phone), a portable computing device (e.g., a laptop), a portable communication device, a personal digital assistant, a network connection device, a content recording device (e.g., a camera, audio recorder, video camera), a vehicular computing and/or communication device, and any other device configured to perform one or more of the access device processes described herein. In certain exemplary embodiments, access device 120 includes a mobile telephone configured to access one or more services provided over network 125.

Figure 2:
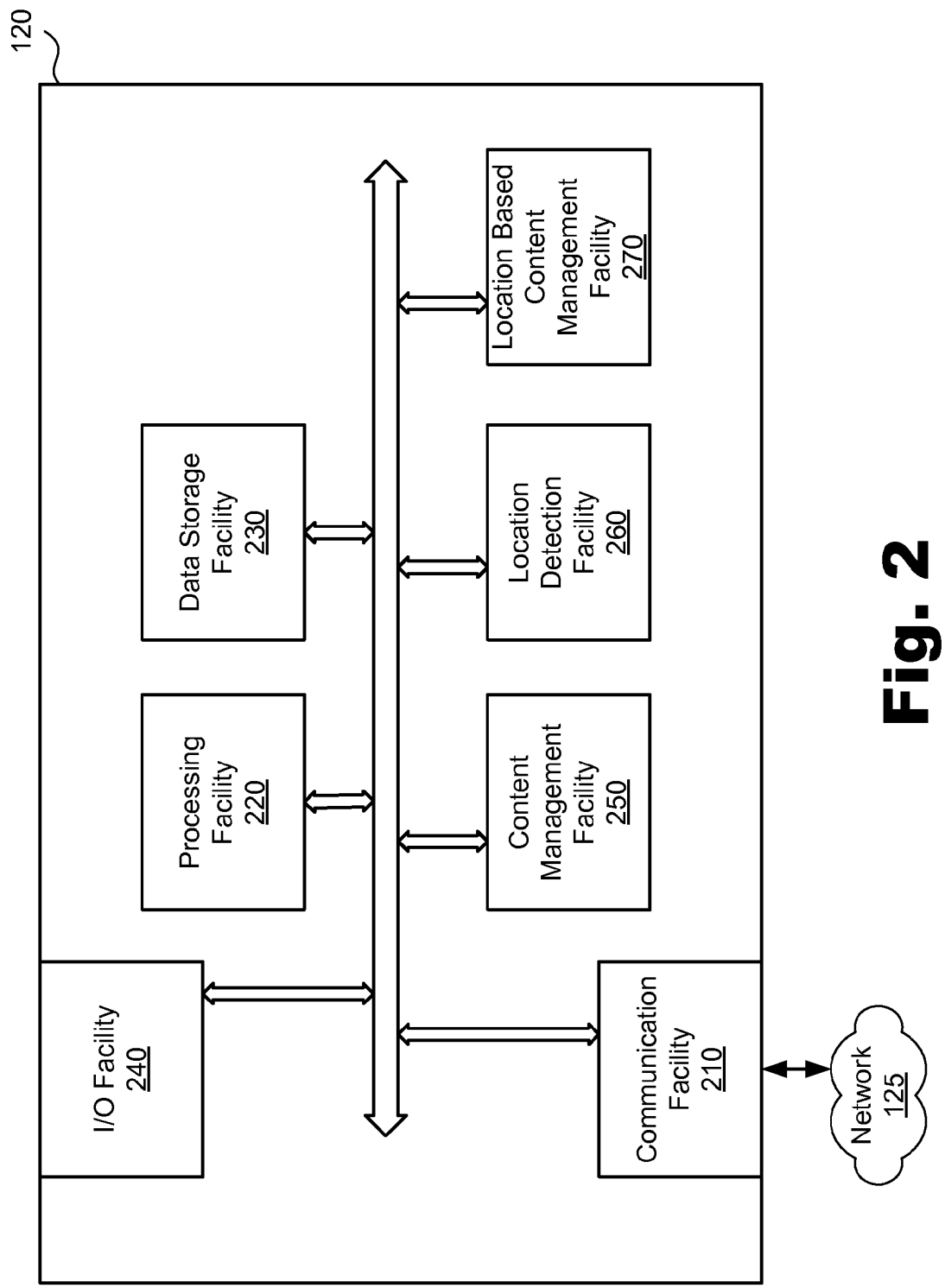
FIG. 2 illustrates an exemplary access device that may be used in the system of FIG. 1.

FIG. 2 illustrates components of an exemplary access device 120. As shown in FIG. 2, access device 120 may include a communication facility 210, processing facility 220, data storage facility 230, inpuVoutput ("1/0") facility 240, content management facility 250, location detection facility 260, and location based content management facility 270 communicatively connected to one another. The facilities 210-270 may be communicatively connected using any suitable technologies. Each of the facilities 210-270 may be implemented as hardware, computing instructions (e.g., software) tangibly embodied on a computer-readable medium, or a combination of hardware and computing instructions configured to perform the processes described herein. In certain embodiments, for example, location based content management facility 270 may be implemented as a software application embodied on a computer-readable medium such as data storage facility 230 and configured to direct the access device 120 (e.g., processing facility 220 of the access device 120) to execute one or more of the processes described herein.

Communication facility 210 may be configured to send and receive communications over network 125, including sending and receiving data representative of content, geographic locations, and other communications to/from content hub subsystem 110. Communication facility 210 may include any device, logic, and/or other technologies suitable for transmitting and receiving data representative of content, geographic locations, and other communications. In certain embodiments, the communication facility 210 may be configured to support other network service communications over network 125, including wireless voice, data, and messaging communications. The communication facility 210 may be configured to interface with any suitable communication media, protocols, formats, platforms, and networks, including any of those mentioned herein.

Processing facility 220 may be configured to control operations of one or more components of the access device 120. Processing facility 220 may direct execution of operations in accordance with computer-executable instructions such as may be stored in data storage facility 230 or other computer-readable medium. As an example, processing facility 220 may be configured to process content, including demodulating, decoding, and parsing received content, and encoding and modulating content for transmission to content hub subsystem 110.

Data storage facility 230 may include one or more data storage media, devices, or configurations and may employ any type, form, and combination of storage media. For example, the data storage facility 230 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data, including data representative of content and/or geographic locations, may be temporarily and/or permanently stored in the data storage facility 230.

1/0 facility 240 may be configured to receive user input and provide user output and may include any hardware, firmware, software, or combination thereof supportive of input and output capabilities. For example, 1/0 facility 240 may include one or more devices for capturing or otherwise creating content, including, but not limited to, a still-shot and/or video camera, scanner, microphone, keyboard or keypad, touch screen component, and receiver (e.g., an RF or infrared receiver). Accordingly, a user 130 of access device 120 can create content (e.g., by taking a picture or drafting a text message), which may be associated with one or more geographic locations and provide the content to content hub subsystem 110 by way of network 125, as described below.

1/0 facility 240 may include one or more devices for presenting content for experiencing by the user 130, including, but not limited to, a graphics engine, a display, display drivers, one or more audio speakers, and one or more audio drivers. Accordingly, 1/0 facility 240 may present content (e.g., play back and/or display) for experiencing by the user 130. 1/0 facility 240 may also be configured to provide other output for the user 130, including providing notifications of posted content becoming accessible as described further below.

Content management facility 250 may be configured to provide one or more tools for management of content, including content that has been created or received using access device 120. For example, content management facility 250 may enable a user 130 to organize content stored to data storage facility 230. As another example, content management facility 250 may provide one or more tools for annotating content, including editing, rating, labeling, adding a note to, commenting about, blocking, reporting, and categorizing content. In certain embodiments, content management facility 250 may be implemented as a software application embodied on a computer-readable medium such as data storage facility 230 and configured to direct the access device 120 (e.g., processing facility 220 of the access device 120) to execute one or more of the content management operations described herein.

Location detection facility 260 may include any hardware, computing instructions (e.g., software), or combination thereof configured to detect a geographic location of the access device 120. An access device 120 may be portable and the geographic location of the access device 120 may change as the access device 120 is transported. In some embodiments, the location detection facility 260 may be configured to utilize Global Positioning System ("GPS") technologies to determine the geographic location of the access device 120 according to GPS coordinates. Other suitable technologies may be used in other embodiments, including using principles of trilateration to evaluate radio frequency signals received by the access device 120 (e.g., RF signals in a wireless phone network) and to estimate the geographic location of the access device 120.

Figure 3:
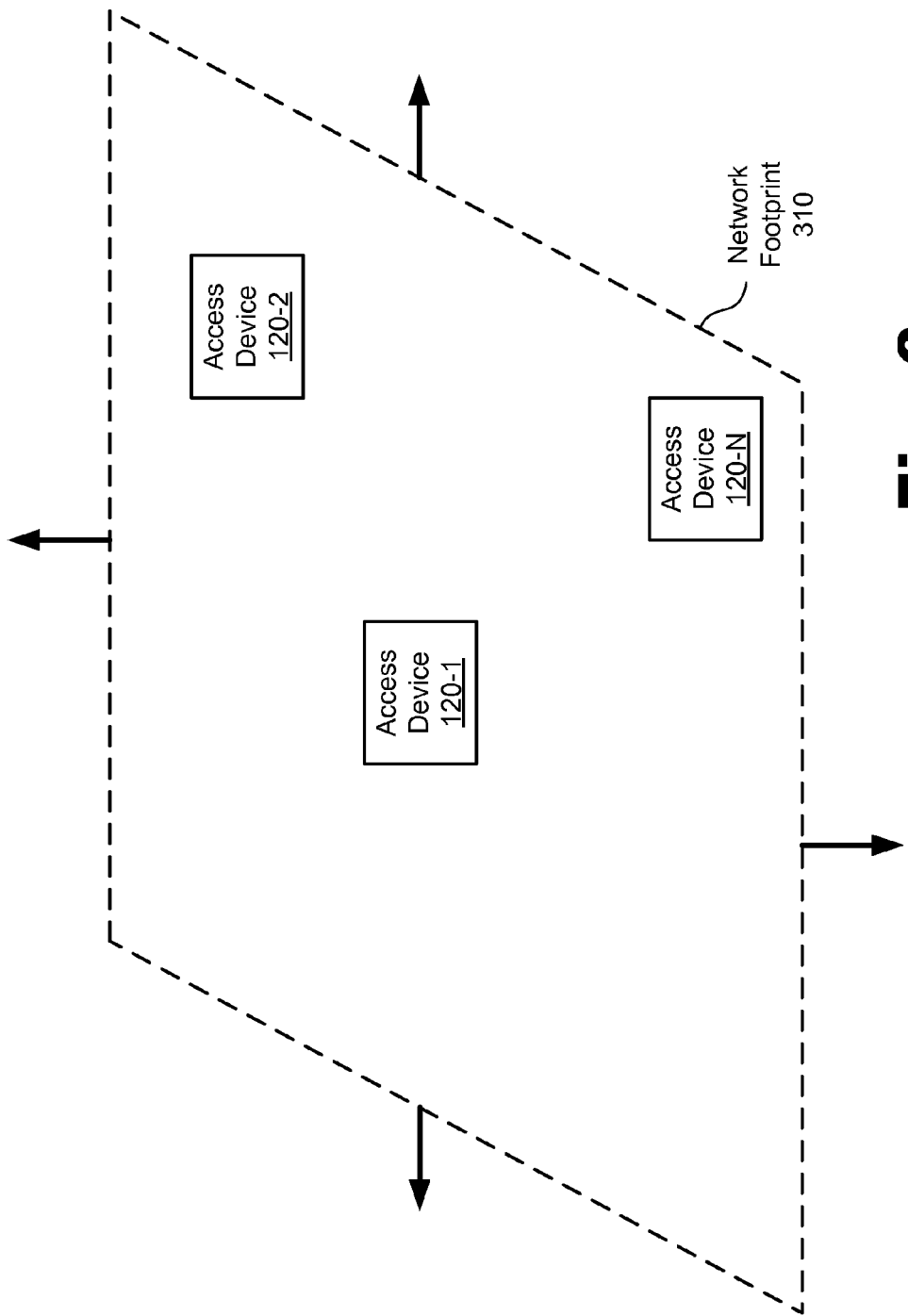
FIG. 3 illustrates access devices physically located within an exemplary network footprint.

FIG. 3 illustrates several access devices 120-1, 120-2, and 120-N physically located at different geographic locations within an exemplary network footprint 310. The network footprint 310 refers to a collective geographic space within which access devices 120 are able to receive network signals (e.g., signals from a satellite or a broadcast tower). As represented by arrows in FIG. 3, the reach of the network footprint 310 may extend beyond the illustrated portion of the network footprint 310. As described above, location detection facility 260 within an access device 120 may detect the geographic location of the access device 120 within the network footprint 310.

Location detection facility 260 may be configured to detect the geographic location of access device 120 periodically at a predetermined frequency or time, or in response to a predetermined trigger event. Such a trigger event may include a detection of a content creation event or receipt of an instruction to detect the current geographic location of the access device 120. As an example, location based content management facility 270 may be configured to recognize when a content instance is created and, in response to such a content creation event, instruct the location detection facility 260 to determine the geographic location of the access device 120.

Location detection facility 260 may generate and provide location data representative of the detected geographic location. For example, the location data may be provided to data storage facility 230 for storage and/or to location based content management facility 270 for further processing. In certain embodiments, location detection facility 260 may be configured to generate and update a historic log of detected geographic locations of the access device 120.

Returning to FIG. 2, location based content management facility 270 may be configured to associate content with location data. For example, a content instance may be created using an access device 120 as described above, and the geographic location of the access device 120 at the time that the content instance is created may be detected as described above. Location based content management facility 270 may create an association between the content instance and the location data representative of the geographic location. This may be accomplished in any suitable manner, including utilizing the location data generated by the location detection facility 260 to create a "geo-tag" that is associated with the content instance.

In this or similar manner, the location based content management facility 270 may associate other information with a content instance, including, but not limited to, time-stamps (e.g., the time and/or date when the content instance was created), user identifiers (e.g., an identifier for a user 130 associated with the access device 120 and/or who created the content instance), and content descriptions or type identifiers (e.g., a photograph content-type identifier). This other information, once associated with the content instance, may be referred to as "other tag data." As described below, geo-tag data and/or other tag data associated with content may be utilized for selective retrieval and distribution of the content.

Location based content management facility 270 may be configured to initiate providing (e.g., uploading) of data representative of the content instance and the associated data (e.g., geo-tag and/or other tag data) to content hub subsystem 110. The provided data, including the content instance, the associated geographic location data, and optionally other data associated with the content instance, may be referred to as a "content imprint" or a "content posting." In certain embodiments, location based content management facility 270 may be configured to provide a user 130 of the access device 120 with an option to provide the data to the content hub subsystem 110. For example, the user may be prompted for approval before the data is provided to the content hub subsystem 110. In other embodiments, location based content management facility 270 may be configured to automatically provide the data to the content hub subsystem 110 once the geo-tag location data has been generated and associated with the content instance.

The location based content management facility 270 provides a user 130 of an access device 120 with a capability of creating and virtually posting a content imprint at a specific location within the network footprint 310. As an example, user 130-1 and access device 120-1 may be physically located at a particular geographic location within the network footprint 310. User 130-1 may utilize the access device 120-1 to create content, such as by taking a photograph. A content instance (e.g., an image file) is generated.

Location based content management facility 270 recognizes a content creation event and instructs the location detection facility 260 to detect the geographic location of the access device 120-1. The location detection facility 260 detects the geographic location and provides location data, i.e., geo-tag data, representing the detected geographic location of the access device 120-1. Location based content management facility 270 associates the location data with the content instance and provides the content instance, associated geo-tag data, and optionally other associated tag data (i.e., a content posting) to the content hub subsystem 110, as described above.

Figure 4:
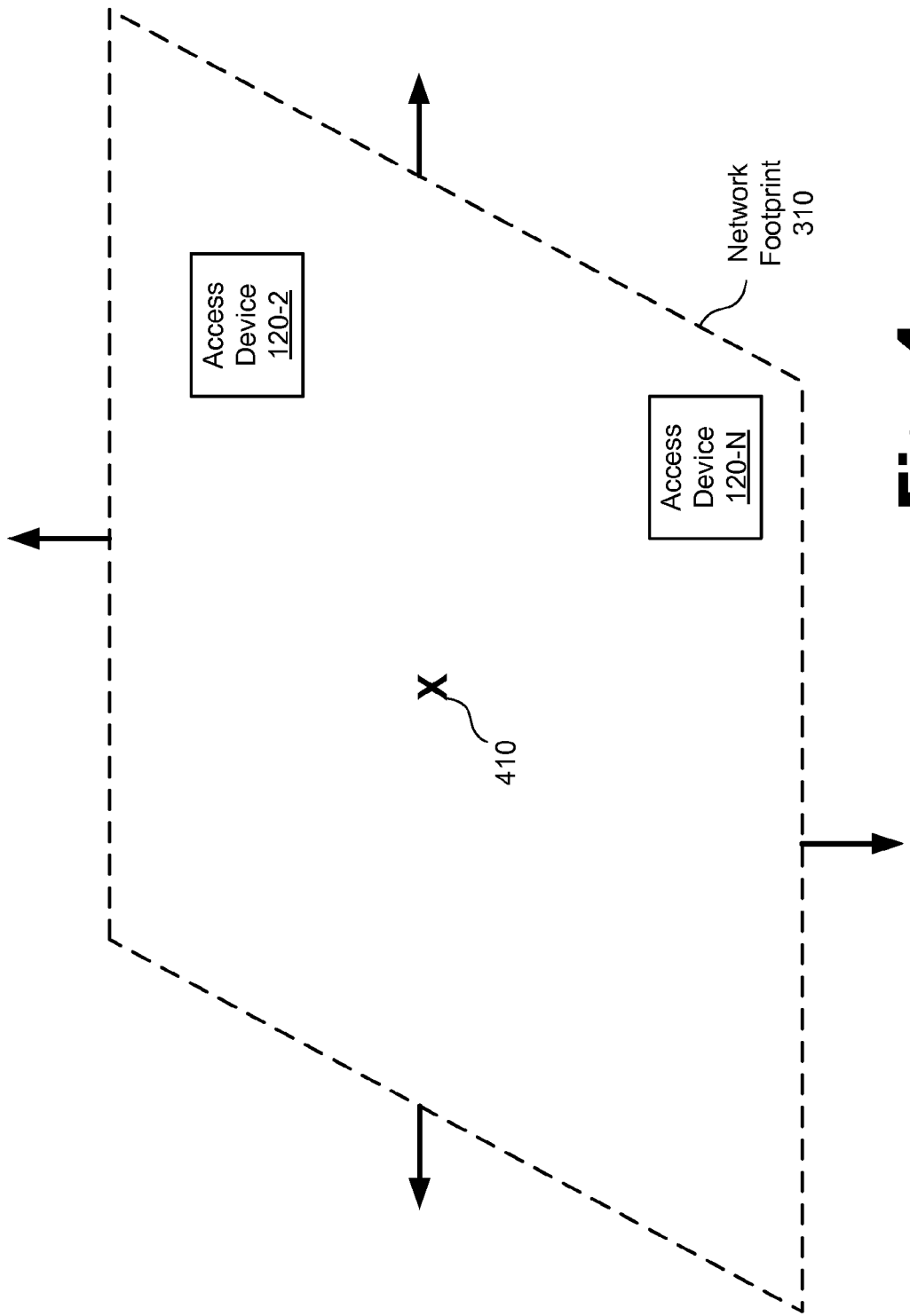
FIG. 4 illustrates an exemplary location based content imprint virtually posted within the network footprint of FIG. 3.

In this or similar manner, user 130-1 may create and virtually post a content imprint including a content instance (e.g., a captured image) associated with a geographic location within the network footprint 310. FIG. 4 illustrates such an exemplary content imprint posting as represented by an "X" symbol 410 placed at the associated geographic location within the network footprint 310. Users 130 may create and virtually post one or more content imprints to content hub subsystem 110, which may be configured to aggregate and store the content for selective, location-based distribution.

Figure 5:
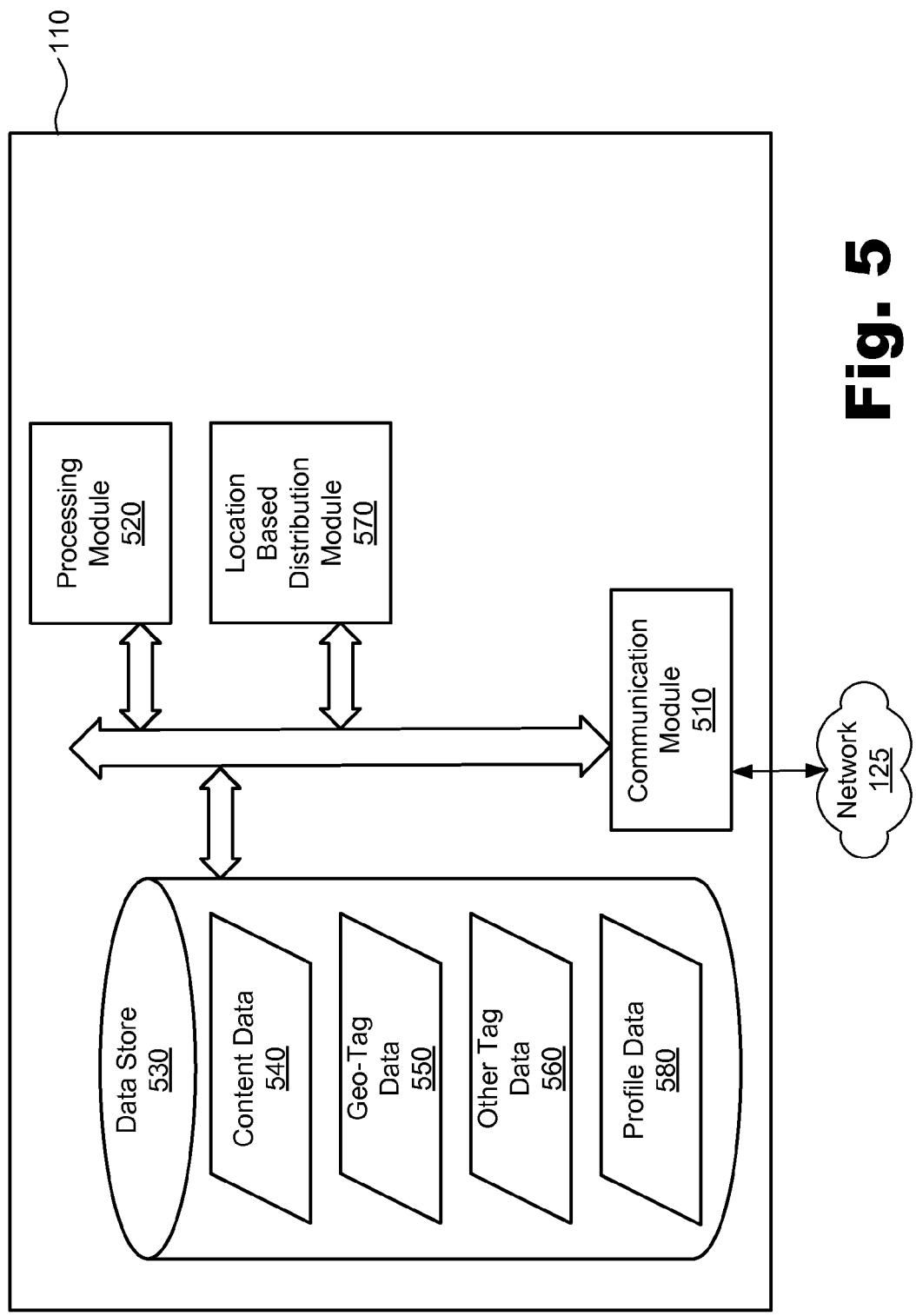
FIG. 5 illustrates an exemplary content hub subsystem that may be included in the system of FIG. 1.

FIG. 5 illustrates an exemplary content hub subsystem 110. The components of content hub subsystem 110 may include or be implemented as hardware, computing instructions (e.g., software) embodied on a computer-readable medium, or a combination thereof. In certain embodiments, for example, one or more components of content hub subsystem 110 may include or be implemented on one or more servers (e.g., an application server, content server, messaging server, and/or web server) configured to communicate over network 125. While an exemplary content hub subsystem 110 is shown in FIG. 5, the exemplary components illustrated in FIG. 5 are not intended to be limiting. Indeed, additional or alternative components and/or implementations may be used.

As shown in FIG. 5, content hub subsystem 110 may include a communication module 510, which may be configured to transmit and receive communications over network 125, including receiving data representative of content and associated data (e.g., location data) from and providing data representative of content to access devices 120 by way of network 125. The communication module 510 may include and/or support any suitable communication platforms and technologies for communicating with and transporting content and associated data to/from access devices 120 over network 125. Communication module 510 may be configured to support a variety of communication platforms, protocols, and formats such that content hub subsystem 110 can receive content from and distribute content to access devices 120 of a variety of platforms (e.g., a mobile telephone service platform, a web-based platform, a subscriber television platform, etc.) and using a variety of communications technologies. Accordingly, the content hub subsystem 110 can support a multi-platform system in which content can be received from and provided to diverse platforms.

Content hub subsystem 110 may include a processing module 520 configured to control operations of components of the access device 120. Processing module 520 may direct execution of operations in accordance with computer-executable instructions stored to a computer-readable medium such as a data store 530. As an example, processing module 520 may be configured to process (e.g., encode, decode, modulate, and/or demodulate) content, data, and communications received from or to be transmitted to access devices 120 over network 125. As another example, processing module 520 may be configured to perform data management operations for storing data to data store 530 and for identifying, indexing, searching, retrieving, modifying, annotating, and/or deleting data stored in data store 530.

Data store 530 may include one or more data storage media, devices, or configurations and may employ any type, form, and combination of storage media. For example, the data store 530 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof.

Data store 530 may store any suitable type or form of electronic data. As shown in FIG. 5, data store 530 may include content data 540, geo-tag data 550, other tag data 560, and profile data 580. Content data 540 may include data representative of one or more content instances that have been received from one or more access devices 120 and stored for selective, location based distribution. Geo-tag data 550 may include data representative of one or more geographic locations associated with corresponding content instances as described above. Geo-tag data 550 may be in any suitable format for identifying a geographic location, including GPS coordinates, for example. Other tag data 560 may include data representative of other information associated with corresponding content instances, including any of the tag information described above. Profile data 580 will be described further below.

As shown in FIG. 5, content hub subsystem 110 may further include a location based distribution module 570, which may include or be implemented as hardware, computing instructions (e.g., software) tangibly embodied on a computer-readable medium, or a combination of hardware and computing instructions configured to perform the location based content distribution processes described herein. In certain embodiments, location based content distribution module 570 may be implemented as a software application embodied on a computer-readable medium such as data store 530 and configured to direct the processing module 520 to execute one or more of the processes described herein.

Figure 6:
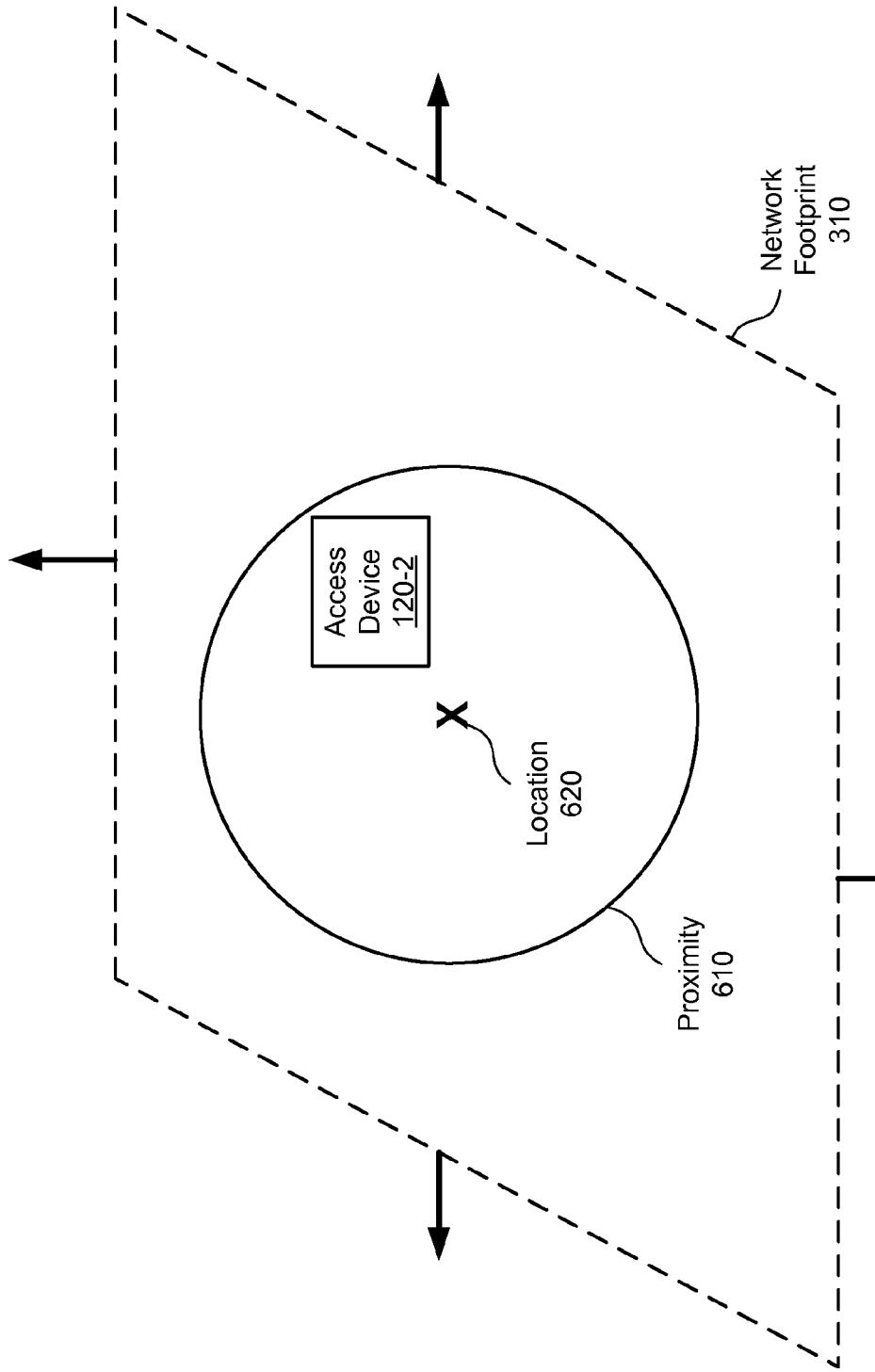
FIG. 6 illustrates an access device located physically proximate to a geographic location associated with the content imprint of FIG. 4.

Location based distribution module 570 may be configured to control selective, location based distribution of posted content data 540. To help facilitate an understanding of selective, location based distribution of content, FIG. 6 illustrates an example of access device 120-2 being physically located within a predefined geographic proximity 610 of a geographic location 620 associated with a content instance included in content data 540. The geographic location 620 may be the same location at which access device 120-1 is used to create and virtually post the content instance as a content imprint, as described above.

When access device 120-2 is at the location shown in FIG. 6, location detection facility 260 may detect the current geographic location of the access device 120-2, as described above. The access device 120-2 may provide this information to content hub subsystem 110. For example, the access device 120-2 may transmit a location status communication including location status information to the content hub subsystem 110 over network 125. Access device 120-2 may provide location status information proactively or in response to a request from content hub subsystem 110.

Location based distribution module 570 of the content hub subsystem 110 may be configured to process the location status information to determine whether the detected geographic location of access device 120-2 qualifies the access device 120-2 for access to the content instance associated with geographic location 620. In certain embodiments, this determination may be based on whether the current location of access device 120-2 is "proximate" to the geographic location 620 associated with the content instance. Location based distribution module 570 may include and/or be configured to utilize a predefined heuristic to define what qualifies as being "proximate." In certain embodiments, "proximate" may refer to the current geographic location of access device 120-2 being within a predefined geographic proximity 610 of the geographic location 620. The proximity may be defined in any suitable way, including as any location that is located within a specific distance (e.g., radial distance) of the geographic location 620. Other definitions of "proximate" may be employed as may suit a particular implementation.

When no "proximity" is found, content hub subsystem 110 may elect not to distribute content to the access device 120-2. On the other hand, when "proximity" is found to exist, location based distribution module 570 may direct content hub subsystem 110 to make the content instance corresponding with the appropriate geographic location 620 accessible to the access device 120-2. With reference to the example shown in FIG. 6, location based distribution module 570 may determine that access device 120-2 is "proximate" to geographic location 620 because the access device 120-2 is located within the predefined proximity 610 of geographic location 620. Accordingly, the geo-tag data 550 for the geographic location 620 may be identified as a proximity match for the current location of access device 120-2 and may be used to identify the corresponding content instance to be distributed to the access device 120-2.

Distribution of the content instance may include making the content instance accessible to the access device 120-2. This may be performed in any suitable way. In certain embodiments, when "proximity" is found, a copy of a corresponding content instance may be automatically provided (e.g., downloaded) to the access device 120-2.

In other embodiments, content hub subsystem 110 may be configured to modify internal settings to establish permissions for the access device 120-2 and/or user 130-2 associated with the access device 120-2 to access and retrieve the content instance. This may be accomplished in any suitable way. For example, content host subsystem 110 may maintain profile data 580 for access devices 120 and/or users 130. The profile data 580 may be updated with appropriate permissions settings and/or with links to appropriate content data 540. For example, a link to the content instance associated with geographic location 620 may be inserted into a profile associated with access device 120-2 and/or user 130-2 in order to make the content instance accessible to the access device 120-2 and/or user 130-2.

Content host subsystem 110 may be configured to provide notifications to one or more access devices 120 indicating that posted content has been made accessible. For example, content host subsystem 110 may provide a notification to access device 120-2 indicating that the content instance associated with geographic location 620 has been made accessible to the access device 120-2. Such notification may be in any suitable form and use any acceptable communication technologies, including any such technologies disclosed herein. The notification may include information associated with the content instance, including a description provided by the user 130-1 who posted the content instance or any other tag data 560 associated with the content instance, for example.

Access device 120-2 may receive the notification, and user 130-2 may elect whether to retrieve the accessible content instance. For example, user 130-2 may respond to the notification and request that a copy of the content instance be retrieved from the content hub subsystem 110 to access device 120-2. Accordingly, based on the above, user 130-2 can access and experience the content instance based on the relation of the location of access device 120-2 to the geographic location 620 associated with the content instance.

In certain embodiments, content instance may be accessible to access device 120-2 and/or user 130-2 only while the access device 120-2 is located "proximate" to the geographic location 620 associated with the content instance. In such embodiments, access to the content instance may be terminated when access device 120-2 is no longer located proximate to the geographic location 620. Accordingly, in some examples, current geographic proximity to the geographic location 620 may be requisite for accessibility to the associated content instance.

In certain other embodiments, once accessibility to content is granted, content hub subsystem 110 may be configured to maintain accessibility of content for a predefined length of time, such as a day, week, month, or indefinitely. Accordingly, user 130-2 and/or access device 120-2 may have access to the content instance associated with geographic location 620 based on past or present detected proximity of the access device 120-2 to the geographic location 620.

Figure 7:
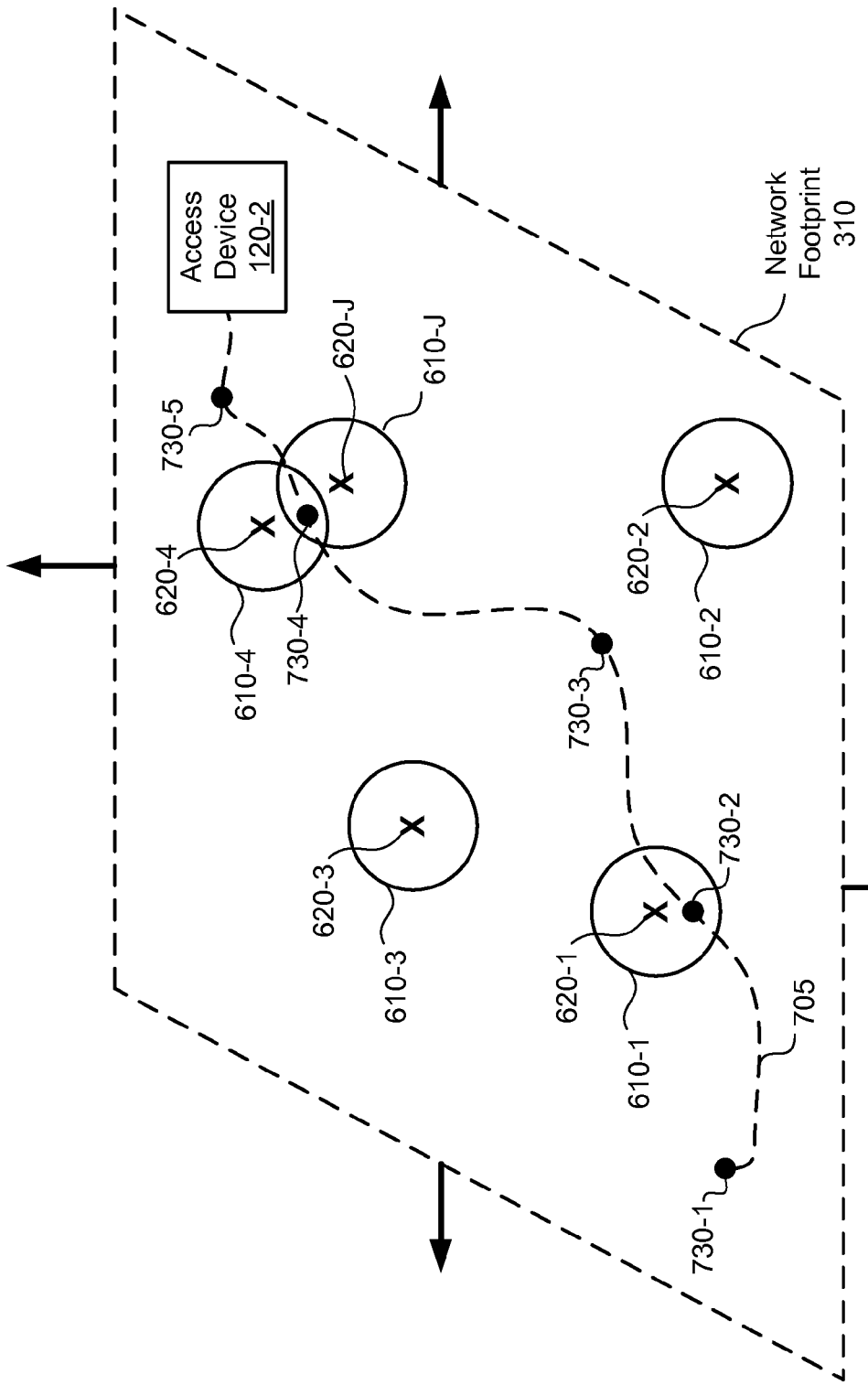
FIG. 7 illustrates an exemplary travel path of an access device relative to a plurality of content imprints virtually posted within the network footprint of FIG. 3.

For example, FIG. 7 illustrates an exemplary travel path 705 of access device 120-2 in relation to several geographic locations 620-1 through 620-J and proximities 610-1 through 610-J associated with content imprints virtually posted within network footprint 310. Reference numbers 730-1 through 730-5 represent several detected geographic locations of access device 120-2 along path 705. As shown in FIG. 7, locations 730-1, 730-3, and 730-5 are located outside of the proximities 610-1 through 610-J. Therefore, in certain embodiments, locations 730-1, 730-3, and 730-5 do not qualify access device 120-2 for access to any of the content imprints associated with geographic locations 620-1 through 620-J.

On the other hand, location 730-2 is located within proximity 610-1, and location 730-4 is located within proximities 610-4 and 610-J. Accordingly, content host subsystem 110 may grant access device 120-2 and/or user 130-2 with access to the posted content instances respectively associated with geographic locations 620-1, 620-4, and 620-J, as described above. In certain embodiments, access may be maintained after access device 120-2 has moved outside of proximities 610-1, 610-4, and 610-J.

Figure 8:
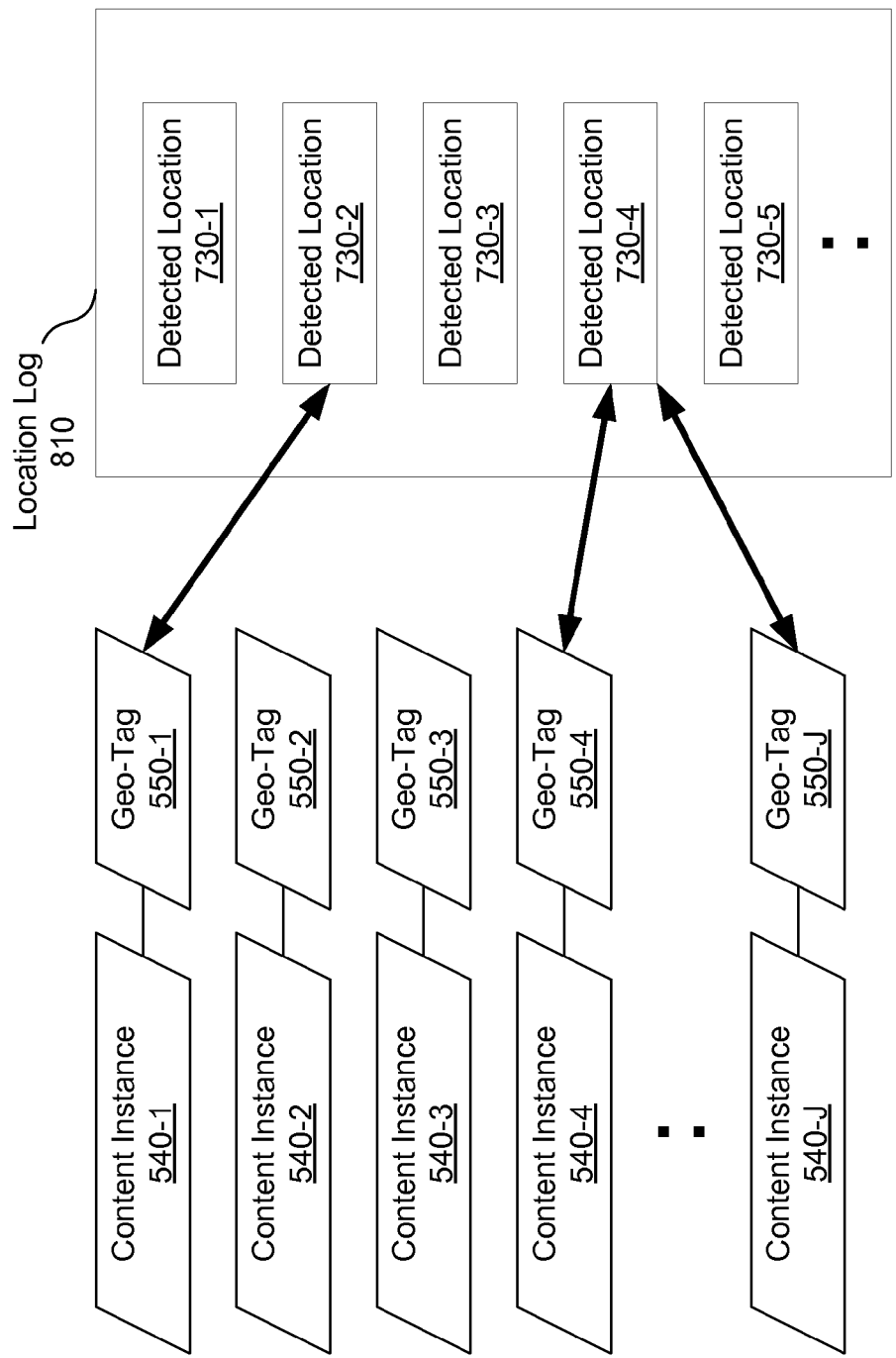
FIG. 8 illustrates exemplary data relationships associated with the travel path of FIG. 7.

FIG. 8 illustrates exemplary data relationships between data records associated with the travel path 705 shown in FIG. 7. As shown in FIG. 8, content data 540 may include content instances 540-1 through 540-J, and geo-tag data 550 may include geo-tags 550-1 through 550-J. Content instances 540-1 through 540-J may represent content respectively associated with geographic locations 620-1 through 620-J shown in FIG. 7. FIG. 8 also shows data representative of the detected locations 730-1 through 730-J of access device 120-2 along travel path 705, as maintained in a location log 810. Location log 810 may be generated by content hub subsystem 110 based on geographic locations reported by the access device 120-2, or the access device 120-2 may generate the location log 810 and provide it to content hub subsystem 110. Content hub subsystem 110 may be configured to utilize data included in the log 810 to search for and identify matching geo-tag data 550, as described above. The arrows illustrated in FIG. 8 represent identified matches between detected location 730-2 and geo-tag 550-1, and between detected location 730-4 and geo-tags 550-4 and 550-J. Thus, based on the illustrated travel path 705 of access device 120-2 shown in FIG. 7, content instances 540-1, 540-4, and 540-J associated with the matching geo-tags 550-1, 550-4, and 550-J, respectively, may be made accessible to access device 120-2 and/or user 130-2 based on the detected locations 730-2 and 730-4 of access device 120-2.

As described above, access device 120-2 may be configured to present content received from content hub subsystem 110 for experiencing by user 130-2, and content management facility 250 within the access device 120-2 may provide one or more tools enabling user 130-2 to annotate the content. For example, access device 120-2 may receive, from content hub subsystem 110, a notification of content instance 540-1 having been made accessible to the access device 120-2 based on detected location 730-2. User 130-2 may choose to experience the content instance 540-1. In addition, user 130-1 may make one or more annotations to the content instance 540-1, including, but not limited to, providing a comment about the content instance 540-1 (e.g., "This video is hilarious!"), rating the content instance 540-1 (e.g., on a predetermined scale), editing the content instance 540-1, blocking the content instance 540-1 from being made accessible to the access device 120-2 and/or user 130-2, and reporting the content instance 540-1 to content hub subsystem 110 (e.g., as including inappropriate or distasteful material).

Access device 120-2 may provide data representative of an annotation to content hub subsystem 110, which may associate the annotation with the content instance 540-1. For example, the annotation may be added to other tag data 560 associated with the content instance 540-1. Accordingly, annotations, like other data associated with content instance 540-1, may be used to index, search, and retrieve the content instance 540-1. For example, a user 130 may search accessible content for specific content instances having a particular rating, associated with a particular creator, created during a particular time range, having associated comments, etc.

System 100 may be configured to enable users 130 to communicate with one another in connection with a geographic location. For example, where user 130-1 created and posted content instance 540-1 at geographic location 620-1, and the content instance 540-1 was made accessible to user 130-2 based on access device 120-2 being detected at location 730-2, users 130-1 and 130-2 may establish and participate in follow-up communications with one another.

Figure 9:
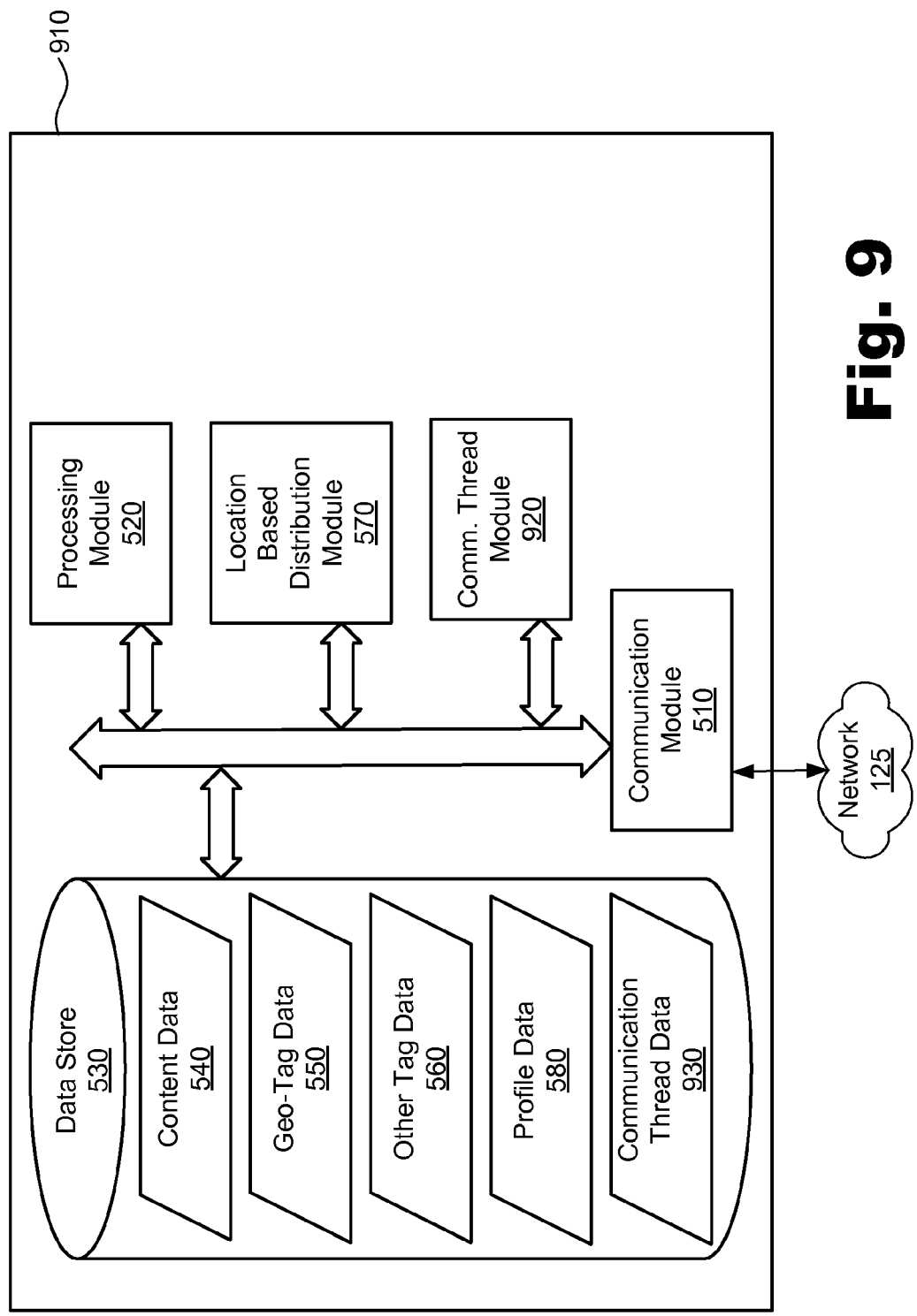
FIG. 9 illustrates another exemplary content hub subsystem that may be included in the system of FIG. 1.

Such follow-up communications may be hosted and made accessible to the involved users (e.g., users 130-1 and 130-2). In some embodiments, such communications are made accessible exclusively to the involved users 130-1 and 130-2. FIG. 9 illustrates an exemplary content hub subsystem 910 configured to facilitate follow-up communications between multiple users 130. Content hub subsystem 910 may be similar to content hub subsystem 110 and may additionally include communication thread module 920, which may be configured to manage follow-up communications, such as communications between users 130-1 and 130-2, as well as access to the follow-up communications. For example, user 130-2 may provide a comment about content instance 540-1. Content hub subsystem 910 may receive and store the comment as other tag data 560 associated with the content instance 540-1. User 130-1 may access the comment and wish to communicate with user 130-2. User 130-1 may provide a follow-up communication to content hub subsystem 910. Communication thread module 920 may recognize the communication as a follow-up communication from user 130-1 to user 130-2 and store the communication as a communication thread in communication thread data 930 hosted on content hub subsystem 110. User 130-2 may respond to the communication, and communication thread module 920 may add this communication to the communication thread between users 130-1 and 130-2.

Communication thread module 920 may control access to the communication thread in any way suitable for limiting access to the users 130-1, 130-2 involved. For example, communication thread module 920 may place a link to the communication thread in the profile data 580 associated with each user 130-1, 130-2 to grant access.

Accordingly, content hub subsystem 910 may be configured to function as a repository hosting communication threads connected with location based content and to selectively grant access to the threads to involved users 130. In certain embodiments, a detected past or present geographic connection between users 130 (or access devices 120 associated with the users 130) is a prerequisite for establishing hosted communication threads between the users 130. Users 130 may utilize the communication threads for various purposes, including discussing relationships or experiences with a geographic location, discussing posted content associated with the location, and scheduling future meetings, for example.

Figure 10:
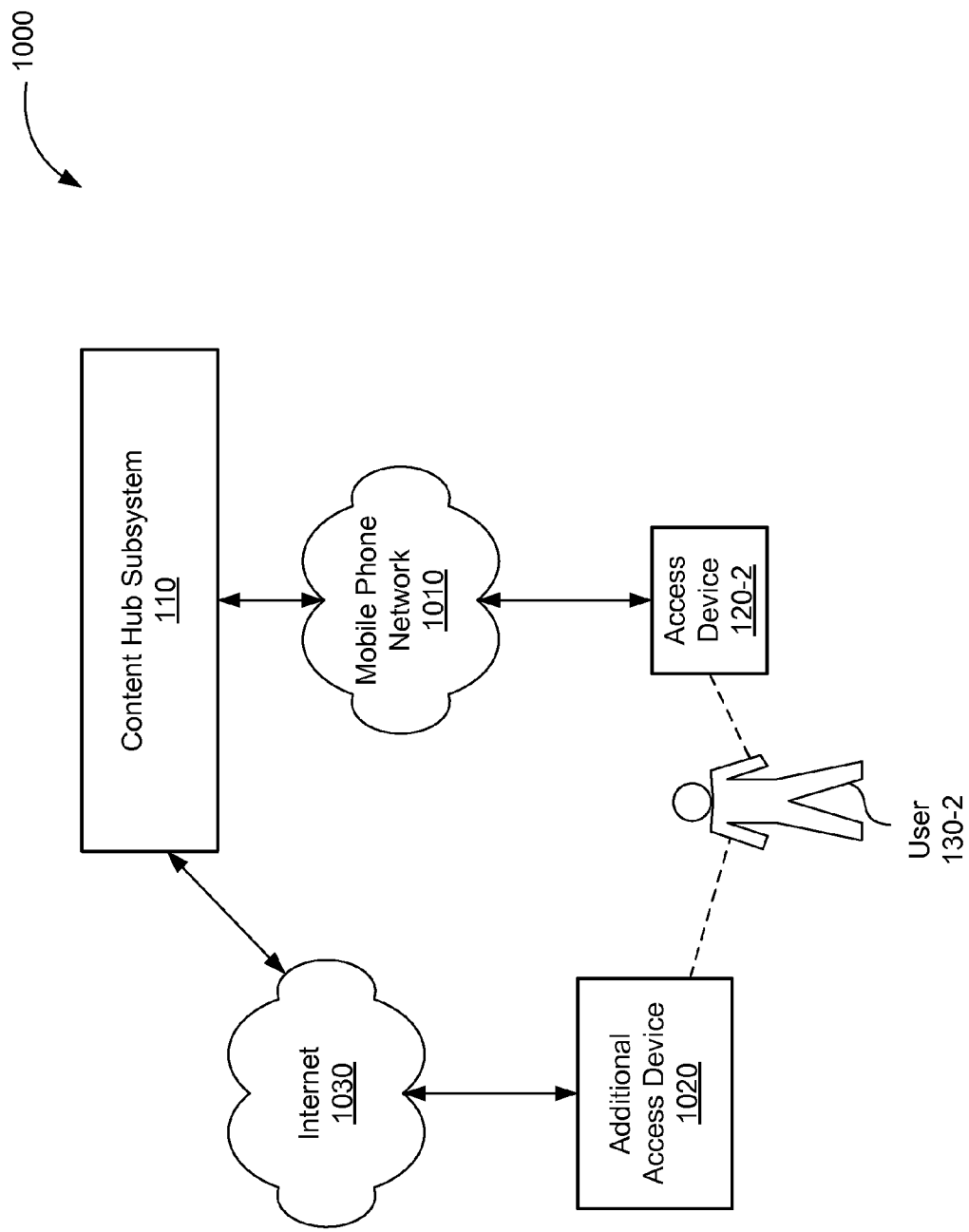
FIG. 10 illustrates an exemplary implementation of the system of FIG. 1.

FIG. 10 illustrates an exemplary implementation 1000 of system 100. As shown in FIG. 10, the implementation 1000 may include content hub subsystem 110 (or content hub subsystem 910) and an access device 120-2 configured to communicate by way of a mobile phone network 1010. Access device 120-2 may communicate with the content hub subsystem 110 over mobile phone network 1010 in any of the ways described above. Accordingly, user 130-2 may utilize access device 120-2 to post content and retrieve and experience content based on geographic location. In addition, content hub subsystem 110 may be configured to support communications with an additional access device 1020 over another connection such as the Internet 1030. Hence, user 130-2 may be able to utilize additional access device 1020 to post and retrieve location-based content. In certain embodiments, additional access device 1020 may be used for posting and/or retrieving content to/from content hub subsystem 110 without having to be located physically proximate to the geographic location associated with the content. For example, the geographic location of access device 120-2 may qualify user 130-2 for access to a content instance. Once qualified, user 130-2 may utilize access device 120-2 or additional access device 1020 to retrieve and experience the content.

As an example, a user 130-2 with access device 120-2 may travel from location 730-1 to 730-5 along travel path 705. The physical detected location 730-2 may qualify user 130-2 for access to content instance 540-1. User 130-2 may elect to utilize additional access device 1020 (e.g., a desktop computer) to retrieve and experience content instance 540-1. Accordingly, after traveling from one location to another with access device 120-2, user 130-2 may use additional access device 1030 to retrieve, experience, and annotate content that has been made accessible to user 130-2 by virtue of the detected geographic locations of access device 120-2.

Figure 11:
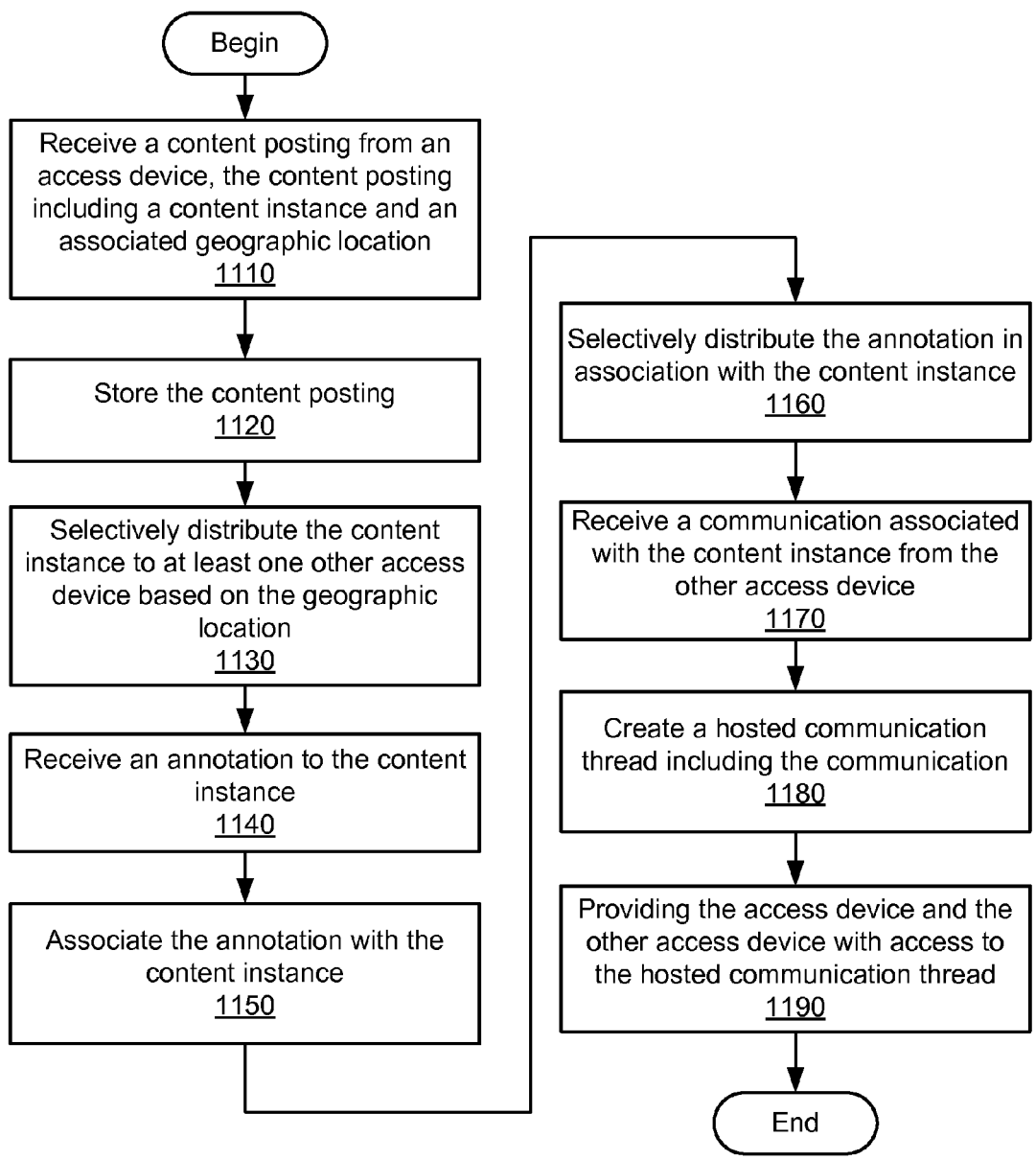
FIG. 11 illustrates an exemplary location based content aggregation and distribution method.

FIG. 11 illustrates an exemplary method of location based content aggregation and distribution from a content hub subsystem perspective. While FIG. 11 illustrates exemplary steps according to one embodiment, other embodiments may omit, add to, reorder, and/or modify any of the steps shown in FIG. 11.

In step 1110, a content posting is received from an access device, such as access device 120-1. The content posting generally includes data representative of a content instance and a geographic location associated with the content instance. The content posting may also include other information associated with the content instance, as described above. Step 1110 may be performed in any of the ways described above, including content hub subsystem 110 receiving the content posting from access device 120-1 over network 125. In certain embodiments, access device 120-1 may create the content instance, determine the geographic location to be the physical location of the access device 120-1, associate the geographic location with the content instance to form the content posting, and transmitting the content posting to the content hub subsystem 110 over network 125.

In step 1120, the content posting is stored. Step 1120 may be performed in any of the ways described above, including content hub subsystem 110 storing the content posting to data store 530.

In step 1130, the content instance is selectively distributed to at least one other access device, such as access device 120-2, based on the geographic location. Step 1130 may be performed in any of the ways described above, including the content hub subsystem 110 detecting that the access device 120-2 is located physically proximate to the geographic location, making the content instance accessible to the access device 120-2, notifying the access device 120-2 of the granted accessibility, receiving a request from the access device 120-2 for the content instance, and/or providing data representative of the content instance to the access device 120-2 over network 125. In some examples, step 1130 may include keeping the content instance accessible to the access device 120-2 for a predetermined length of time, including maintaining accessibility when the access device 120-2 is no longer located physically proximate to the geographic location.

In step 1140, an annotation to the content instance is received. Step 1140 may be performed in any of the ways described above, including content hub subsystem 110 receiving the annotation from an access device 120 over network 125.

In step 1150, the annotation is associated with the content instance. Step 1150 may be performed in any of the ways described above, including modifying the content instance and/or incorporating the annotation in tag data 550 associated with the content instance.

In step 1160, the annotation is selectively distributed in association with the content instance. Step 1160 may be performed in any of the ways described above, including making the annotation and the content instance accessible to an access device such as access device 120-2.

In step 1170, a communication associated with the content instance is received from the other access device 120-2. Step 1170 may be performed in any of the ways described above.

In step 1180, a hosted communication thread including the communication is created. Step 1180 may be performed in any of the ways described above, including content hub subsystem 1180 creating and hosting the communication thread.

In step 1190, the access device 120-1 and the other access device 120-2 are provided with access to the hosted communication thread. Step 1190 may be performed in any of the ways described above The exemplary systems and methods described above may support a wide variety of applications and uses. As one example, a user 130-1 may utilize an access device 120-1 (e.g., a mobile phone) to record a video at a local skate park. The access device 120-1 may be configured to detect the geographic location 620 at which the video content was created, associate the video content with the geographic location 620, and post the video content and location data representative of the geographic location 620 to the content hub subsystem 110. This may be referred to as posting a location based content imprint. When another user 130-2 with another access device 120-2 visits the skate park and enters within a predefined geographic proximity 610 of the geographic location 620 associated with the posted video content, the content hub subsystem 110 may send a notification of the accessible content to the access device 120-2, and the user 130-2 may utilize the access device 120-2 to download and experience the video content.

With the geographic connection to the skate park established and the content instance accessible to user 130-2, either of the two users 130-1 and 130-2 may annotate the video content and/or create a communication thread between each other, as described above. For example, user 130-2 may view the video and provide a comment, e.g., "That move was sweet!" to content hub subsystem 110. Other visitors to the skate park may similarly gain access to any posted content associated with the geographic location of the skate park.

With the geographic connection to the skate park established and the content instance accessible to user 130-2, either of the two users 130-1 and 130-2 may provide a communication to the content hub subsystem 110 in connection with the content instance. The content hub subsystem 110 may create a hosted communication thread including any communications between the two users 130-1 and 130-2 and provide the same users 130-1 and 130-2 with access to the hosted thread. Accordingly, users 130-1 and 130-2 can communicate with another in relation to content associated with the skate park.

As another example, during a trip a user 130-1 may post content to the content hub subsystem 110 and subsequently use the posted content as a travel log. For instance, user 130-1 may access and group posted content based on the different geographic locations associated with the content and/or a period of time corresponding with the trip. The posted content may be presented in the form of a virtual travel log or scrapbook.

As another example, a user 130-2 may travel to a particular geographic location and gain access to posted content associated with the geographic location. User 130-2 may be able to utilize the posted content to plan and/or improve the user's 130-2 activities at the geographic location. For example, posted content may include suggestions as to recommended places to eat, places or people to visit, things to buy, best photo opportunities, local events, etc. Such postings may be provided by other travelers and may be based on their experiences.

As yet another example, content postings may be used to distribute local information. For instance, an organization may provide content postings for informational purposes, including information about road construction, road closures, traffic patterns and conditions, ski resort conditions, travel directions, venues, hotels, eateries, shopping, schools, events, etc. As a specific example, a sporting event venue may post content including game highlights, schedules, maps, and team roster information. As another specific example, a college may post class information, maps, and parking information.

Users 130 who gain access to the posted information may annotate and/or respond to the information as described above. For example, a user viewing posted content descriptive of road construction timeframes may notify the organization that posted the content about current site conditions (e.g., the road has been reopened or travel is restricted to one lane).

While certain examples described above include location-based requirements for posting and/or having access to posted content, other embodiments may do away with such requirements. In certain alternative embodiments, for example, it may be sufficient for a user 130 of an access device 120 or an additional access device 1030 to specify a geographic location to be associated with content to be posted or retrieved to/from content hub subsystem 110. In yet other embodiments, other requirements for posting and/or accessing posted content may be employed, including, but not limited to, user memberships in predefined groups and user subscriptions.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising, by a computing system:
   receiving a content posting from a device associated with a first user, the content posting including data representative of a content instance and a geographic location associated with the content instance;
   determining that a second user is associated with the geographic location associated with the content instance, wherein the determination is based on a first client device associated with the second user being or having been within a predefined proximity of the geographic location associated with the content instance; and
   enabling, based on the second user being associated with the geographic location associated with the content instance, one or more communications between a client device associated with the first user and a second client device associated with the second user, wherein the communications are associated with the content instance.

2. The method of claim 1, wherein the second user is granted access to the content instance.

3. The method of claim 1, wherein the content instance is distributed to the client device associated with the second user.

4. The method of claim 1, wherein the one or more communications comprise one or more comments about the content instance.

5. The method of claim 1, wherein enabling the one or more communications between the client device associated with the first user and the client device associated with the second user comprises granting the device of the second user access to a communication thread associated with the content instance.

6. The method of claim 5, further comprising granting access to the communication thread to a client device associated with a third user, wherein the third user is associated with the geographic location associated with the content instance.

7. The method of claim 1, wherein the client device associated with the second user is associated with the geographic location associated with the content instance.

8. The method of claim 1, wherein the device associated with the first user is distinct from the client device associated with the first user.

9. The method of claim 1, wherein the geographic location is a location of the device associated with the first user when the content posting is received.

10. The method of claim 1, further comprising sending a notification to the client device associated with the second user, the notification indicating an availability of the content instance.

11. The method of claim 10, further comprising:
subsequent to sending the notification, distributing the content instance to a third client device associated with the second user.

12. The method of claim 1, further comprising:
receiving an annotation to the content instance from the first user or the second user;
associating the annotation with the content instance; and
selectively distributing the annotation in association with the content instance.

13. The method of claim 12, wherein the annotation comprises a comment about the content instance, a rating of the content instance, or an edit to the content instance.

14. The method of claim 1, wherein the first and second users are members of a group, and wherein the first and second users being members of the group is requisite to the enabling of the one or more communications between the client device associated with the first user and the client device associated with the second user.

15. The method of claim 1, further comprising:
associating the content instance with tag data, wherein the tag data comprises at least one of a timestamp, a user identifier, a content description, and a content type identifier.

16. The method of claim 15, further comprising:
including the tag data in a notification to be sent to the device of the second user indicating an availability of the content instance.

17. The method of claim 1, wherein the first client device associated with the second user is the second client device associated with the second user.

18. One or more computer-readable non-transitory storage media embodying software that is operable when executed to:
receive a content posting from a device associated with a first user, the content posting including data representative of a content instance and a geographic location associated with the content instance;
determine that a second user is associated with the geographic location associated with the content instance, wherein the determination is based on a first client device associated with the second user being or having been within a predefined proximity of the geographic location associated with the content instance; and
enable, based on the second user being associated with the geographic location associated with the content instance, one or more communications between a client device associated with the first user and a second client device associated with the second user, wherein the communications are associated with the content instance.

19. The media of claim 18, wherein enabling the one or more communications between the client device associated with the first user and the client device associated with the second user comprises granting the device of the second user access to a communication thread associated with the content instance.

20. The media of claim 19, wherein the software is further operable when executed to grant access to the communication thread to a client device associated with a third user, wherein the third user is associated with the geographic location associated with the content instance.

21. The media of claim 18, wherein the second user is granted access to the content instance.

22. The media of claim 18, wherein the content instance is distributed to the client device associated with the second user.

23. The media of claim 18, wherein the one or more communications comprise one or more comments about the content instance.

24. The media of claim 18, wherein the client device associated with the second user is associated with the geographic location associated with the content instance.

25. The media of claim 18, wherein the device associated with the first user is distinct from the client device associated with the first user.

26. The media of claim 18, wherein the geographic location is a location of the device associated with the first user when the content posting is received.

27. The media of claim 18, wherein the software is further operable when executed to send a notification to the client device associated with the second user, the notification indicating an availability of the content instance.

28. The media of claim 27, wherein the software is further operable when executed to:
subsequent to sending the notification, distribute the content instance to a third client device associated with the second user.

29. The media of claim 18, wherein the software is further operable when executed to:
receive an annotation to the content instance from the first user or the second user;
associate the annotation with the content instance; and
selectively distribute the annotation in association with the content instance.

30. The media of claim 29, wherein the annotation comprises a comment about the content instance, a rating of the content instance, or an edit to the content instance.

31. The media of claim 18, wherein the first and second users are members of a group, and wherein the first and second users being members of the group is requisite to the enabling of the one or more communications between the client device associated with the first user and the client device associated with the second user.

32. The media of claim 18, wherein the software is further operable when executed to:
associate the content instance with tag data, wherein the tag data comprises at least one of a timestamp, a user identifier, a content description, and a content type identifier.

33. The media of claim 32, wherein the software is further operable when executed to:
include the tag data in a notification to be sent to the device of the second user indicating an availability of the content instance.

34. A system comprising: one or more processors; and a non-transitory memory coupled to the processors comprising instructions executable by the processors, the processors operable when executing the instructions to:

receive a content posting from a device associated with a first user, the content posting including data representative of a content instance and a geographic location associated with the content instance;

determine that a second user is associated with the geographic location associated with the content instance, wherein the determination is based on a first client device associated with the second user being or having been within a predefined proximity of the geographic location associated with the content instance; and enable, based on the second user being associated with the geographic location associated with the content instance, one or more communications between a client device associated with the first user and a second client device associated with the second user, wherein the communications are associated with the content instance.

35. The system of claim 34, wherein the second user is granted access to the content instance.

36. The system of claim 34, wherein the content instance is distributed to the client device associated with the second user.

37. The system of claim 34, wherein the one or more communications comprise one or more comments about the content instance.

38. The system of claim 34, wherein enabling the one or more communications between the client device associated with the first user and the client device associated with the second user comprises granting the device of the second user access to a communication thread associated with the content instance.

39. The system of claim 38, wherein the processors are further operable when executing the instructions to grant access to the communication thread to a client device associated with a third user, wherein the third user is associated with the geographic location associated with the content instance.

40. The system of claim 34, wherein the client device associated with the second user is associated with the geographic location associated with the content instance.

41. The system of claim 34, wherein the device associated with the first user is distinct from the client device associated with the first user.

42. The system of claim 34, wherein the geographic location is a location of the device associated with the first user when the content posting is received.

43. The system of claim 34, wherein the processors are further operable when executing the instructions to send a notification to the client device associated with the second user, the notification indicating an availability of the content instance.

44. The system of claim 43, wherein the processors are further operable when executing the instructions to:

subsequent to sending the notification, distribute the content instance to a third client device associated with the second user.

45. The system of claim 34, wherein the processors are further operable when executing the instructions to:

receive an annotation to the content instance from the first user or the second user;

associate the annotation with the content instance; and selectively distribute the annotation in association with the content instance.

46. The system of claim 45, wherein the annotation comprises a comment about the content instance, a rating of the content instance, or an edit to the content instance.

47. The system of claim 34, wherein the first and second users are members of a group, and wherein the first and second users being members of the group is requisite to the enabling of the one or more communications between the client device associated with the first user and the client device associated with the second user.

48. The system of claim 34, wherein the processors are further operable when executing the instructions to:

associate the content instance with tag data, wherein the tag data comprises at least one of a timestamp, a user identifier, a content description, and a content type identifier.

49. The system of claim 48, wherein the processors are further operable when executing the instructions to:

include the tag data in a notification to be sent to the device of the second user indicating an availability of the content instance.

* * * * *